Aug. 31, 1954     H. G. SHAKESPEARE ET AL     2,687,855
SPINNING TYPE FISHING REEL
Filed Nov. 20, 1950     2 Sheets-Sheet 1
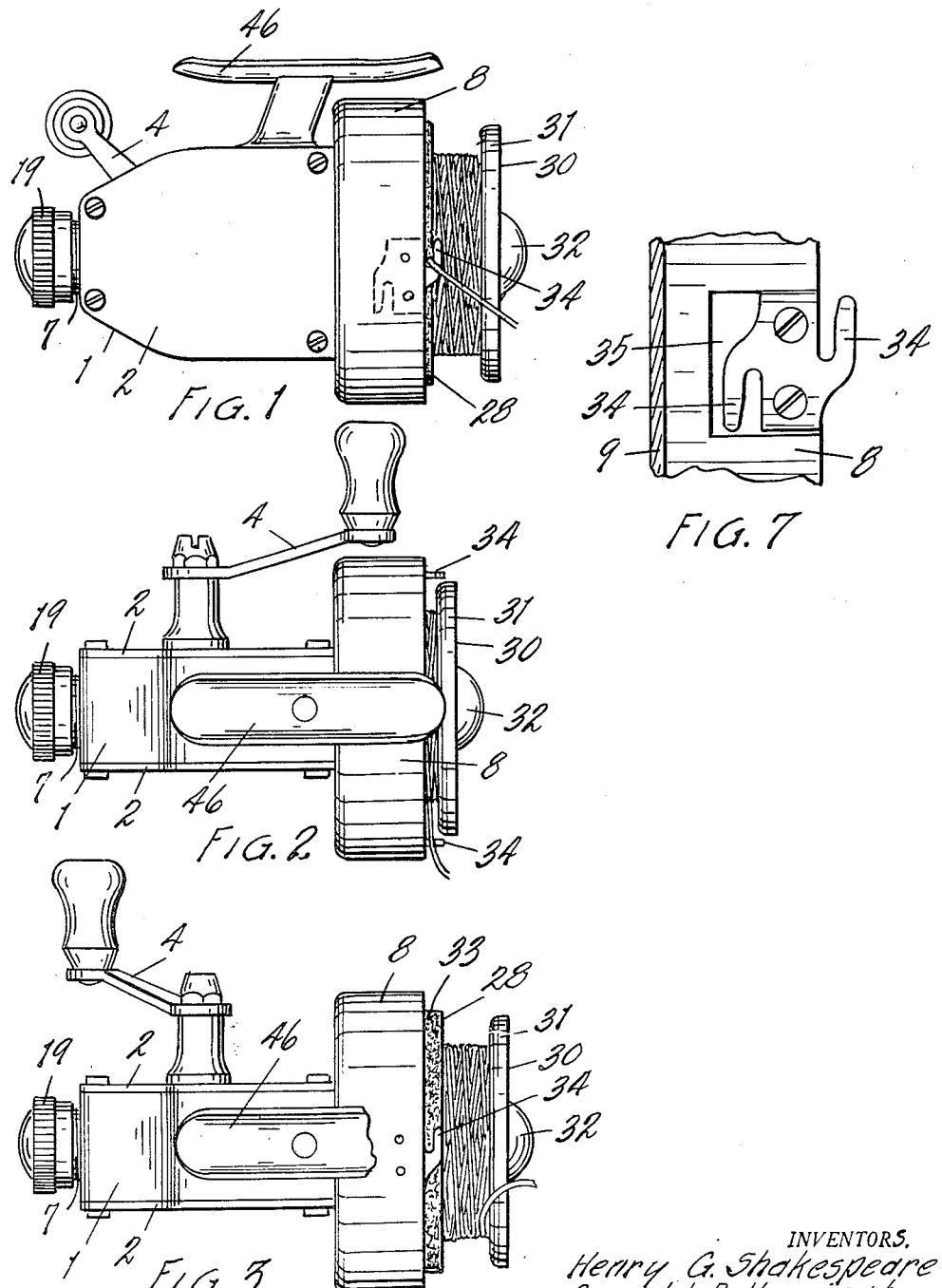

INVENTORS.
Henry G. Shakespeare
Gerald D. Harrington
By
Attorney.

Patented Aug. 31, 1954

2,687,855

UNITED STATES PATENT OFFICE 2,687,855

SPINNING TYPE FISHING REEL

Henry G. Shakespeare and Gerald D. Harrington, Kalamazoo, Mich., assignors to Shakespeare Company, Kalamazoo, Mich.

Application November 20, 1950, Serial No. 196,574

14 Claims. (Cl. 242—84.4)

This invention relates to improvements in spinning type fishing reel.

The principal objects of this invention are:

First, to provide a spinning type fishing reel including a level winding means which is controlled from the crank to wind the line upon the spool when the crank is rotated in one direction and to project and hold the spool in projected position for casting when the crank is reversely actuated.

Second, to provide a spinning type fishing reel having these advantages in which variable friction may be applied to the spool to meet requirements as in playing a fish.

Third, to provide a fishing reel having these advantages which is very simple and compact in structure and at the same time the parts are arranged so as not to be subjected to undue stress.

Objects relating to details and economies of the invention will appear from the description to follow. The invention is defined and pointed out in the claims.

A preferred embodiment of the invention is illustrated in the accompanying drawing, in which:

Fig. 1 is a side elevational view of a fishing reel embodying the invention with the parts in line winding position.

Fig. 2 is a plan view with the parts in another line winding position.

Fig. 3 is a plan view with the reel seat clip partially broken away with the spool in projected casting position.

Fig. 7 is an enlarged fragmentary view partially in section of the line winding member.

Figure 4:
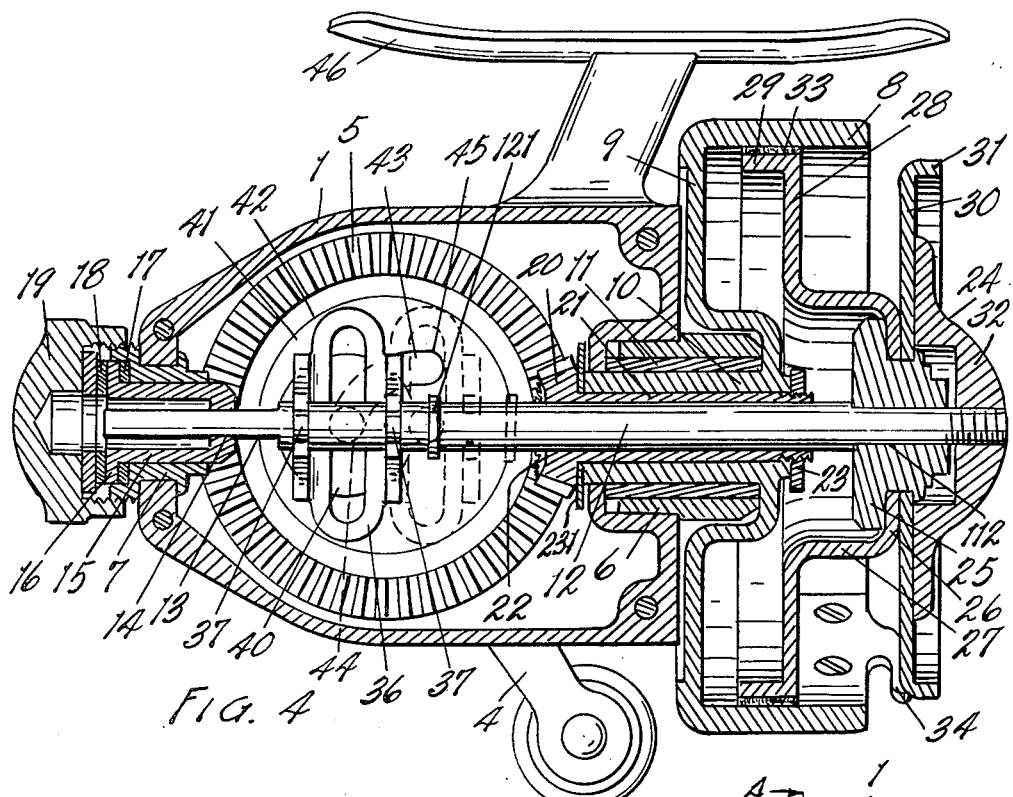
Fig. 4 is an enlarged view mainly in longitudinal section on a line corresponding to line 4—4 of Fig. 6, the Scotch yoke on the spool spindle being shown in one position by full lines and in another position by dotted lines to indicate the stroke thereof.

The embodiment of the invention illustrated comprises a gear box or casing 1 having removable side plates 2—2. The shaft 3 of the crank 4 is rotatably mounted on one of the side plates and has a beveled driving gear 5 mounted on its inner end. The gear box is provided with a front bearing 6 for the line winding member 8 and with a rear spindle bearing 7 axially aligned with the bearing 6. The line winding member 8 has a cylindrical peripheral portion and is open at its forward end. At its rear end it is provided with a web 9 having a hub 10 arranged within the bearing 6 provided with a bushing 11.

The spool spindle 12 has a non-circular portion 13 at its rear end reciprocatingly supported in the non-circular opening 14 of the bearing member 15 supported in the bearing 7. The bearing member 15 has a flange 16 disposed between the friction disks 17 and 18 for frictionally restraining the rotation of the bearing member 15, the cap 19 being threaded upon the bearing 7 so that desired friction drag may be applied to the spindle.

It will be understood that the spool does not rotate when a cast is made. When, however, the winding member is being rotated to wind the line on the spool in reeling in a fish the pull of the fish may rotate the spool against this friction drag on the spindle.

The driven gear 20 is provided with a sleeve 21 receiving the spindle and extends through the hub 10 of the line winding member 8 and is secured or connected thereto desirably by a drive or press fit engagement therewith. A nut 23 is threaded upon the forward end of the sleeve 21 to engage the hub 10. A washer 231 is disposed between the gear 20 and the rear end of the hub. The spool designated generally by the numeral 24 comprises the hub 25 receiving the inturned flange 26 on the barrel portion 27 of a combined spool flange and barrel member, this member including the rear spool flange 28 which terminates in a rearwardly turned peripheral rim 29 reciprocating within the member 8.

The front spool flange 30 is provided with a forwardly turned rim 31 over which the line is paid out as the cast is made. The forward or front flange of the spool 30 is mounted on the hub 25. The hub 25 is retained on the flattened or noncircular end 112 of the spindle by the nut 32 threaded upon the spindle. This nut is rounded to eliminate any line engaging angles.

The rim of the inner spool flange is provided with a peripheral yieldable brush-like facing 33, which prevents the line becoming engaged between the rear spool flange and the member 8. The member 8 is provided with a line winding hook or finger 34 which has a plate body portion seated in a recess 35 in the inner wall of the member 8 (see Fig. 7). This member 34 illustrated is provided with a winding finger on each edge so that it may be reversed should one finger become worn. The spindle is reciprocated as the line winding member 8 is rotated, the means by which this is accomplished in the embodiment illustrated comprising the Scotch yoke 36, which is disposed between the thrust members 37 on the spindle to be engaged by the pin 39. The pin 39 is floatingly supported by the disk 40 disposed between the yoke 36 and the wear plate 41 seated in a chamber 42 provided therefor in the face of the gear 5. This wear plate 41 is provided with a curved slot 43 which is engaged by the inner end of the pin. When the crank is rotated in line winding direction, the pin engages the end 44 of the slot 43, as shown in Fig. 4, and serves as a wrist pin driving the yoke and consequently reciprocating the spool spindle. At the same time, the line winding member 8 is rotated in line winding direction.

Figures 5, 6:
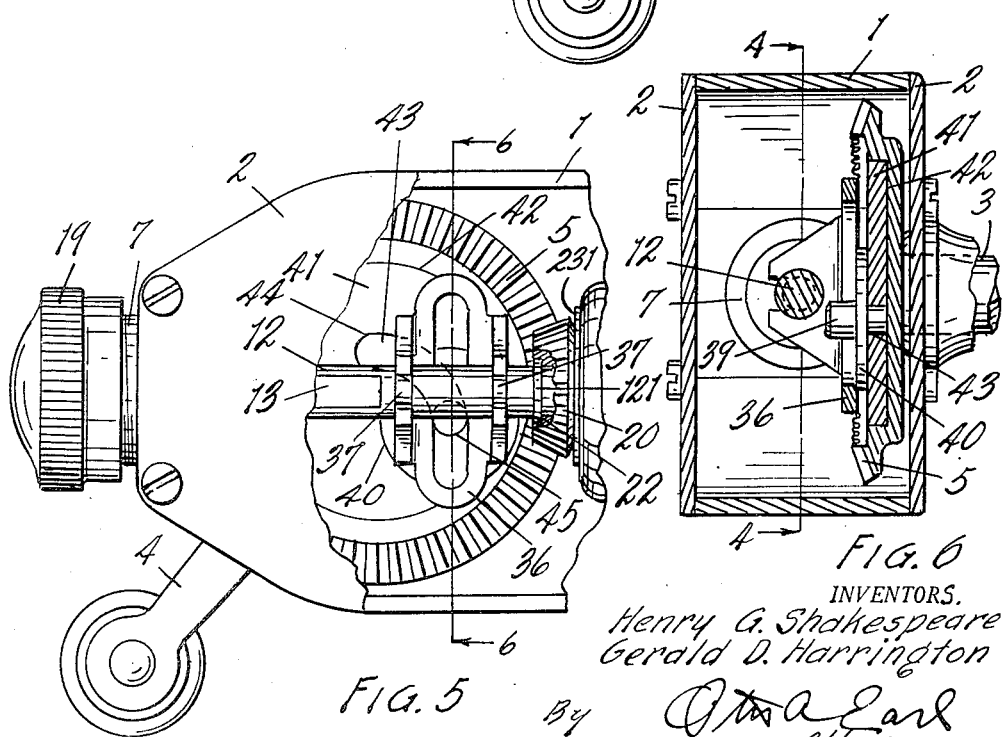
Fig. 5 is a fragmentary side elevation with the driving gear in reverse actuated position to hold the spool in projected position as shown in Fig. 3.
Fig. 6 is a fragmentary view in section on a line corresponding to line 6—6 of Fig. 5.

When the crank is actuated in the reverse direction, the pin engages the end 45 of the slot, and the spool is actuated to its fully projected position as shown in Fig. 3. The end 45 of the slot 43 is farther from the axis of rotation of the wear plate 41 than is the end 44 of the slot 43, as shown in Figs. 4 and 5, whereby the spool is actuated to the fully projected position of Fig. 3 when the crank is actuated in reverse direction. To check the reciprocation of the spindle as well as the reverse rotation of the winding member 8, the spindle is provided with a stop 121 which engages the face 22 of the gear 20 (see Fig. 5). When a cast is about to be made the crank is first rotated in a reverse direction until the stop 121 engaging the face 22 stops such reverse rotation, this reverse rotation actuates the spool to the forward position of Fig. 3 and automatically disengages the winding finger 34 from the line. The rear face of the finger 34, that is, the face adjacent to the winding member 8, is disposed relative to the direction of reverse rotation of the winding member to provide a substantially unobstructed surface for movement of the finger relative to the line during such reverse rotation to facilitate the automatic release of the finger from the line.

With the parts in the position shown in Fig. 3, a cast can be made in the usual manner of a spinning reel. When it is desired to retrieve the line, the line is engaged with the winding finger and the crank operated in line winding direction, the operator desirably guiding the line to the spool by a finger of the hand grasping the rod.

When the reel is in its fully projected position, as shown in Fig. 3, the faced rim of the rear spool flange serves as a guard for the line pick-up or winding finger so that the line cannot become accidentally engaged therewith or snagged thereon. This is desirable as it will be understood there may be some whipping action of the line as it is drawn off from the spool in ordinary casting, especially if the reel is being manipulated by an unskilled operator. In the embodiment illustrated, there are two of the line holding or pick-up fingers 34. This, however, is mainly a matter of convenience.

In the embodiment illustrated, the gear box or casing 1 is provided with a reel seat engaging clip 46, which is the structure being designed to be mounted on the underside of a rod.

We have illustrated and described our invention in what we consider as being a highly desirable commercial embodiment thereof. We have not attempted to illustrate or describe certain modifications and adaptations which we contemplate, as we believe the disclosure made will enable those skilled in the art to embody or adapt our invention as may be desired.

Having thus described our invention, what we claim as new and desire to secure by Letters Patent is:

1. In a fishing reel, the combination of a gear box having alignment front and rear bearings, an open cylindrical forwardly facing line winding member provided with a hub rotatably supported in said front bearing, a spindle having a non-circular portion at its rear end, a spindle bearing member mounted in said rear bearing of said gear box and with which said non-circular portion has axial sliding engagement, adjustable friction means for said spindle bearing member, a driving gear provided with a crank, a coacting driven gear on said spindle provided with a sleeve projecting through the hub of said line winding member and having driving connection therewith, a Scotch yoke mounted on said spindle, a connecting pin for said yoke and driving gear, said driving gear being provided with a curved slot with which said pin is floatingly engaged whereby the spindle is reciprocated when the driving gear is rotated in line winding direction and the spindle is projected when the gear is reversely rotated, a spool comprising a hub mounted on said spindle, a rear flange member reciprocable within said line winding member and having an integral barrel mounted on said hub, a front spool flange mounted on said spool hub and provided with a forwardly projecting peripheral line guiding rim, and a line engaging finger on the forward edge of said line winding member, said inner spool flange rim constituting a guard for said winding finger when the spool is in its forward position.

2. In a fishing reel, the combination of a gear box having aligned front and rear bearings, an open cylindrical forwardly facing line winding member provided with a hub rotatably supported in said front bearing, a spindle having a non-circular portion at its rear end, a spindle bearing member mounted in said rear bearing of said gear box and with which said non-circular portion has axial sliding engagement, adjustable drag means for said spindle bearing member, a driving gear provided with a crank, a coacting driven gear on said spindle provided with a sleeve projecting through the hub of said line winding member and having driving connection therewith, a Scotch yoke mounted on said spindle, a connecting pin for said yoke and driving gear, said driving gear being provided with a curved slot with which said pin is floatingly engaged whereby the spindle is reciprocated when the driving gear is rotated in line winding direction and the spindle is projected when the gear is reversely rotated, a spool comprising a hub mounted on said spindle, a rear flange member reciprocable within said line winding member and having an integral barrel mounted on said hub, a front spool flange mounted on said spool hub, and a line engaging finger on the forward edge of said line winding member.

3. In a fishing reel, the combination of a gear box having aligned front and rear bearings, an open cylindrical forwardly facing line winding member provided with a hub rotatably supported in said front bearing, a spindle having a non-circular portion at its rear end, a spindle bearing member mounted in said rear bearing of said gear box and with which said non-circular portion has axial sliding engagement, a driving gear provided with a crank, a coacting driven gear on said spindle having driving connections to said line winding member, a Scotch yoke mounted on said spindle, a connecting pin for said yoke and driving gear, said driving gear being provided with a slot with which said pin is floatingly engaged whereby the spindle is reciprocated when the driving gear is rotated in one direction and the spindle is projected when the gear is reversely rotated, a stop on said spindle limiting its projecting stroke, a spool on said spindle comprising a rear flange reciprocable within said line winding member and a front flange, and a line winding finger on the forward edge of said line winding member, said inner spool flange rim constituting a guard for said winding finger when the spool is in its forward position.

4. In a fishing reel, the combination of a gear box having aligned front and rear bearings, an open cylindrical forwardly facing line winding member provided with a hub rotatably supported in said front bearing, a spindle having a non-circular portion at its rear end, a spindle bearing member mounted in said rear bearing of said gear box and with which said non-circular portion has axial sliding engagement, a driving gear provided with a crank, a coacting driven gear on said spindle having driving connection to said line winding member, a Scotch yoke mounted on said spindle, a connecting pin for said yoke and driving gear, said driving gear being provided with a slot with which said pin is floatingly engaged whereby the spindle is reciprocated when the driving gear is rotated in one direction and the spindle is projected when the gear is reversely rotated, a spool on said spindle comprising a rear flange reciprocable within said line winding member and a front flange, and a line winding finger on said line winding member.

5. In a fishing reel, the combination of a gear box having aligned front and rear bearings, an open cylindrical forwardly facing line winding member provided with a hub rotatably supported in said front bearing, a spindle bearing member mounted in the rear bearing, a reciprocatingly mounted spindle reciprocatingly engaged with said rear bearing member, a driving gear provided with a crank, a coacting driven gear on said spindle and connected to the hub of said line winding member and having driving connection therewith, driving connections for said spindle to said driving gear whereby the spindle is reciprocated as said line winding member is rotated, a spool on said spindle comprising front and rear flanges, the rear flange being reciprocable within said line winding member and having a rearwardly projecting peripheral rim provided with a yieldable peripheral brush-like facing acting to prevent the entrance of a line between the line winding member and the rear spool flange, and a hook-like line winding finger on the forward edge of said line winding member facing in the direction of line winding rotation thereof, and means operable upon reverse rotation of the line winding member for projecting the spool to a forward position where the inner spool flange rim closes and constitutes a closure for said line winding member, said hook-like finger being automatically released from the line upon said reverse rotation of the line winding member, the rear face of the finger being disposed relative to the direction of said reverse rotation of the winding member to provide a substantially unobstructed surface for movement of the finger relative to the line during said reverse rotation to facilitate said automatic release of the finger from the line.

6. In a fishing reel, the combination of a gear box having aligned front and rear bearings, an open cylindrical forwardly facing line winding member provided with a hub rotatably supported in said front bearing, a spindle bearing member mounted in the rear bearing, a reciprocatingly mounted spindle reciprocatingly engaged with said rear bearing member, a driving gear provided with a crank, a coacting driven gear on said spindle and connected to the hub of said line winding member and having driving connection therewith, driving connections for said spindle to said driving gear whereby the spindle is reciprocated as said line winding member is rotated, a spool on said spindle comprising front and rear flanges, the rear flange being reciprocable within said line winding member and having a rearwardly projecting peripheral rim, a hook-like winding finger on said line winding member facing in the direction of the line winding rotation thereof, and means operable upon reverse rotation of said line winding member for projecting said spool to a forward position where the rear spool flange rim closes and constitutes a guard for said line winding finger, said finger automatically releasing the line upon said reverse rotation of the line winding member, the rear face of the finger being disposed relative to the direction of said reverse rotation of the winding member to provide a substantially unobstructed surface for movement of the finger relative to the line during said reverse rotation to facilitate said automatic release of the finger from the line.

7. In a fishing reel, the combination of a gear box, a forwardly facing rotatably mounted spool housing member, a spindle having a non-circular portion at its rear end, a spindle bearing member receiving said non-circular portion for axial sliding movement and provided with adjustable friction drag means, a manually actuated driving gear, a coacting driven gear having driving connection to said housing member, a Scotch yoke on said spindle, a connection pin for said yoke and driving gear, and a spool mounted on said spindle to be reciprocated therewith, said driving gear being provided with a slot in which said pin is floatingly mounted so that the pin engages one end of the slot when the driving gear is rotated in direction to drive said housing member and in the other end of the slot to project the spool in casting position when the driving gear is rotated in the other direction.

8. In a fishing reel, the combination of a gear box, a forwardly facing rotatably mounted spool housing member, a spindle mounted for axial reciprocation, a manually actuated driving gear, a coacting driven gear having driving connection to said housing member, a Scotch yoke on said spindle, a connecting pin for said yoke and driving gear, and a spool mounted on said spindle to be reciprocated therewith, said driving gear being provided with a slot in which said pin is floatingly mounted so that the pin engages one end of the slot when the driving gear is rotated in direction to drive said housing member and reciprocate the spindle and the other end of the slot when the gear is rotated in the other direction to project the spindle.

9. In a fishing reel, the combination of a gear box, a forwardly facing rotatably mounted spool housing member, a spindle mounted for axial reciprocation, a manually actuated driving gear, a coacting driven gear having driving connection to said housing member, a Scotch yoke on said spindle, a connecting pin for said yoke and driving gear, said driving gear being provided with a slot in which said pin is floatingly mounted the pin being positioned at one end of the slot when the driving gear is rotated in direction to drive said housing member and at the other end of the slot when the gear is rotated in the other direction to project the spindle to casting position, a spool mounted on said spindle to be reciprocated therewith, said spool comprising a rear flange having a rearwardly projecting peripheral rim provided with a yieldable peripheral facing acting to prevent the entrance of a line between the housing and the rear spool flange, and a line winding element on said housing member acting to wind the line upon the spool as the housing member is rotated and the spool is reciprocated.

10. In a fishing reel, the combination of a casing, a spindle rotatably and reciprocatingly mounted therein, a drag for restraining rotation of said spindle, a spool on said spindle, a rotatably mounted line winding member operably associated with said spool, manually operated actuating means for said spool and line winding member comprising a driving gear, a driven gear having driving connection with said line winding member, a Scotch yoke on said spindle, a connecting pin for said yoke and driving gear, said driving gear being provided with a slot with which said pin is floatingly engaged for reciprocating the spindle when the driving gear is rotated in one direction and projects the spindle when the gear is rotated in the reverse direction, and a stop on said spindle limiting its projecting movement.

11. In a fishing reel, the combination of a casing, a spindle rotatably and reciprocatingly mounted therein, a drag for restraining rotation of said spindle, a spool on said spindle, a rotatably mounted line winding member operably associated with said spool, manually operated actuating means for said spool and line winding member comprising a driving gear, a driven gear having driving connection with said line winding member, a Scotch yoke on said spindle, a connecting pin for said yoke and driving gear, said driving gear being provided with a slot with which said pin is floatingly engaged for reciprocating the spindle when the driving gear is rotated in one direction and projects the spindle when the gear is rotated in the reverse direction.

12. In a fishing reel, the combination of a casing, a spindle rotatably and reciprocatingly mounted therein, a spool on said spindle, a rotatably mounted line winding member operably associated with said spool, manually operated actuating means for said spool and line winding member comprising a driving gear, a driven gear having driving connection with said line winding member, a Scotch yoke on said spindle, a connecting pin for said yoke and driving gear, said driving gear being provided with a slot with which said pin is floatingly engaged, the ends of the slots being positioned so that when the pin is at the inner end of the slot it constitutes a crank for reciprocatingly actuating said yoke and acts to project the spindle when the driving gear is reversely actuated.

13. In a fishing reel, the combination of a casing, a spindle rotatably and reciprocatingly mounted therein, frictional means for restraining rotation of said spindle, a spool on said spindle, a rotatably mounted line winding member operably associated with said spool, manually operated actuating means for said spool and line winding member comprising a driving gear, a driven gear having driving connection with said line winding member, and means for reciprocating said spindle as the line winding member is rotated when the driving gear is rotated in line winding direction and acting to project said spindle to casting position when the driving gear is rotated in the reverse direction comprising a Scotch yoke mounted on said spindle, a connecting pin for said yoke and driving gear, said gear being provided with a curved slot with which said pin is floatingly engaged whereby the spindle is reciprocated when the driving gear is rotated in line winding direction and the spindle is projected when the gear is reversely rotated.

14. In a fishing reel, the combination of a casing, a spindle rotatably and reciprocatingly mounted therein, a spool on said spindle, a rotatably mounted line winding member operably associated with said spool, manually operated actuating means for said spool and line winding member comprising a driving gear, a driven gear having driving connection with said line winding member, and means for reciprocating said spindle as the line winding member is rotated when the driving gear is rotated in line winding direction and acting to project said spindle when the driving gear is rotated in the reverse direction comprising a Scotch yoke mounted on said spindle, a connecting pin for said yoke and driving gear, said gear being provided with a curved slot with which said pin is floatingly engaged whereby the spindle is reciprocated when the driving gear is rotated in line winding direction and the spindle is projected when the gear is reversely rotated.

References Cited in the file of this patent

UNITED STATES PATENTS

| Number | Name | Date |
|---|---|---|
| 2,495,621 | Young et al. | Jan. 24, 1950 |
| 2,548,073 | Siegrist | Apr. 10, 1951 |

FOREIGN PATENTS

| Number | Country | Date |
|---|---|---|
| 861,383 | France | Oct. 28, 1940 |
| 577,244 | Great Britain | May 10, 1946 |
| 262,494 | Switzerland | Oct. 17, 1949 |